(12) United States Patent
Rock et al.

(10) Patent No.: US 9,017,895 B2
(45) Date of Patent: Apr. 28, 2015

(54) DUAL CHANNEL STEP IN FUEL CELL PLATE

(75) Inventors: Jeffrey A. Rock, Fairport, NY (US);
Gerald W. Fly, Geneseo, NY (US);
Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 670 days.

(21) Appl. No.: 12/949,134

(22) Filed: Nov. 18, 2010

(65) Prior Publication Data

US 2012/0129070 A1    May 24, 2012

(51) Int. Cl.
*H01M 8/04* (2006.01)
*H01M 8/02* (2006.01)

(52) U.S. Cl.
CPC ........ *H01M 8/04089* (2013.01); *H01M 8/0204* (2013.01); *H01M 8/0258* (2013.01); *Y02E 60/50* (2013.01)

(58) Field of Classification Search
None
See application file for complete search history.

(56) References Cited

U.S. PATENT DOCUMENTS

| 6,232,008 B1* | 5/2001 | Wozniczka et al. | 429/434 |
| 2008/0014488 A1* | 1/2008 | Kushibiki et al. | 429/30 |
| 2008/0292916 A1 | 11/2008 | Newman et al. | |
| 2009/0208803 A1* | 8/2009 | Farrington | 429/30 |
| 2010/0099001 A1* | 4/2010 | Owejan et al. | 429/34 |

* cited by examiner

*Primary Examiner* — Alix Eggerding
(74) *Attorney, Agent, or Firm* — Fraser Clemens Martin & Miller LLC; James D. Miller

(57) ABSTRACT

A fuel cell plate assembly includes a first plate having a feed region and an active region. A plurality of flow channels is formed in the first plate and connects the feed region and the active region. The first plate further includes a first step oriented transverse to the flow channels in the feed region and a second step oriented transverse to the flow channels in the active region. The second step is formed only in the flow channels of the first plate.

20 Claims, 3 Drawing Sheets

US 9,017,895 B2

DUAL CHANNEL STEP IN FUEL CELL PLATE

FIELD OF THE INVENTION

The present disclosure relates to a fuel cell and, more particularly, to a plate for the fuel cell.

BACKGROUND OF THE INVENTION

A fuel cell has been proposed as a clean, efficient, and environmentally-responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media, such as carbon fiber paper, which facilitates a delivery of reactants, such as hydrogen, to the anode and oxygen to the cathode.

In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. The electrodes of the fuel cell are generally formed from a finely-divided catalyst. The catalyst may be any electrocatalyst that catalytically supports at least one of an oxidation of hydrogen or methanol, and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, the electrodes, the diffusion media, and a subgasket for the separation of reactant fluids are generally disposed between a pair of fuel cell plates. The pair of fuel cell plates constitutes an anode plate and a cathode plate. Each of the fuel cell plates may have a plurality of channels formed therein in an active region for distribution of the reactants and a coolant to the fuel cell. Each of the fuel cell plates may also have headers with ports and channels in a feed region for delivery of the reactants and the coolant to the active region of the fuel cell. The electrolyte membrane, the electrodes, and the diffusion media are generally disposed in the active region. The subgasket is generally coupled with the electrolyte membrane and disposed in the feed region between the pair of fuel cell plates.

The fuel cell plates are typically formed by a conventional process for shaping sheet metal such as stamping, machining, molding, or photo etching through a photolithographic mask, for example. In the case of a bipolar fuel cell plate assembly, the fuel cell plate assembly is typically formed from a pair of unipolar plates, which are then joined to form the bipolar fuel cell plate assembly. An exemplary bipolar plate is disclosed in U.S. patent application Ser. No. 11/752,993 to Newman et al., the entire disclosure of which is hereby incorporated herein by reference.

Compressive stresses are known to occur within the fuel cell stack. The compressive stresses generally occur at locations along the fuel cell plates, between which the electrolyte membrane, the electrodes, the diffusion media, and the subgasket are disposed. In particular, the compressive stresses are known to occur at the edges of the diffusion media and the subgasket. Past efforts to relieve edge stresses by using very thin subgaskets and softer diffusion media have contributed to a degraded performance of the fuel cell stack.

There is a continuing need for a fuel cell plate assembly design that desirably manages compressive stresses at edges of the diffusion media and the subgasket between a pair of the fuel cell plates.

SUMMARY OF THE INVENTION

In concordance with the instant disclosure, a fuel cell plate assembly design that desirably manages compressive stresses at edges of the diffusion media and the subgasket between a pair of the fuel cell plate assemblies, is surprisingly discovered.

In one embodiment, a fuel cell plate assembly includes a first plate having a feed region and an active region. A plurality of flow channels is formed in the first plate and connects the feed region and the active region. The first plate further includes a first step oriented transverse to the flow channels in the feed region and a second step oriented transverse to the flow channels in the active region.

In another embodiment, a fuel cell includes a first fuel cell plate assembly and a second fuel cell plate assembly. Each of the first fuel cell plate assembly and the second fuel cell plate assembly have a feed region and an active region, a plurality of flow channels formed therein and connecting the feed region and the active region. Each of the first fuel cell plate assembly and the second fuel cell plate assembly also includes a first step oriented transverse to the flow channels in the feed region and a second step oriented transverse to the flow channels in the active region. A membrane electrode assembly is sandwiched between a pair of diffusion medium layers. The membrane electrode assembly and the diffusion media are disposed between the active regions of the first plate and the second plate. A subgasket is coupled with the membrane electrode assembly and disposed between the feed regions of the first plate and the second plate.

In a further embodiment, a fuel cell stack includes a plurality of the fuel cells arranged in a stack.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
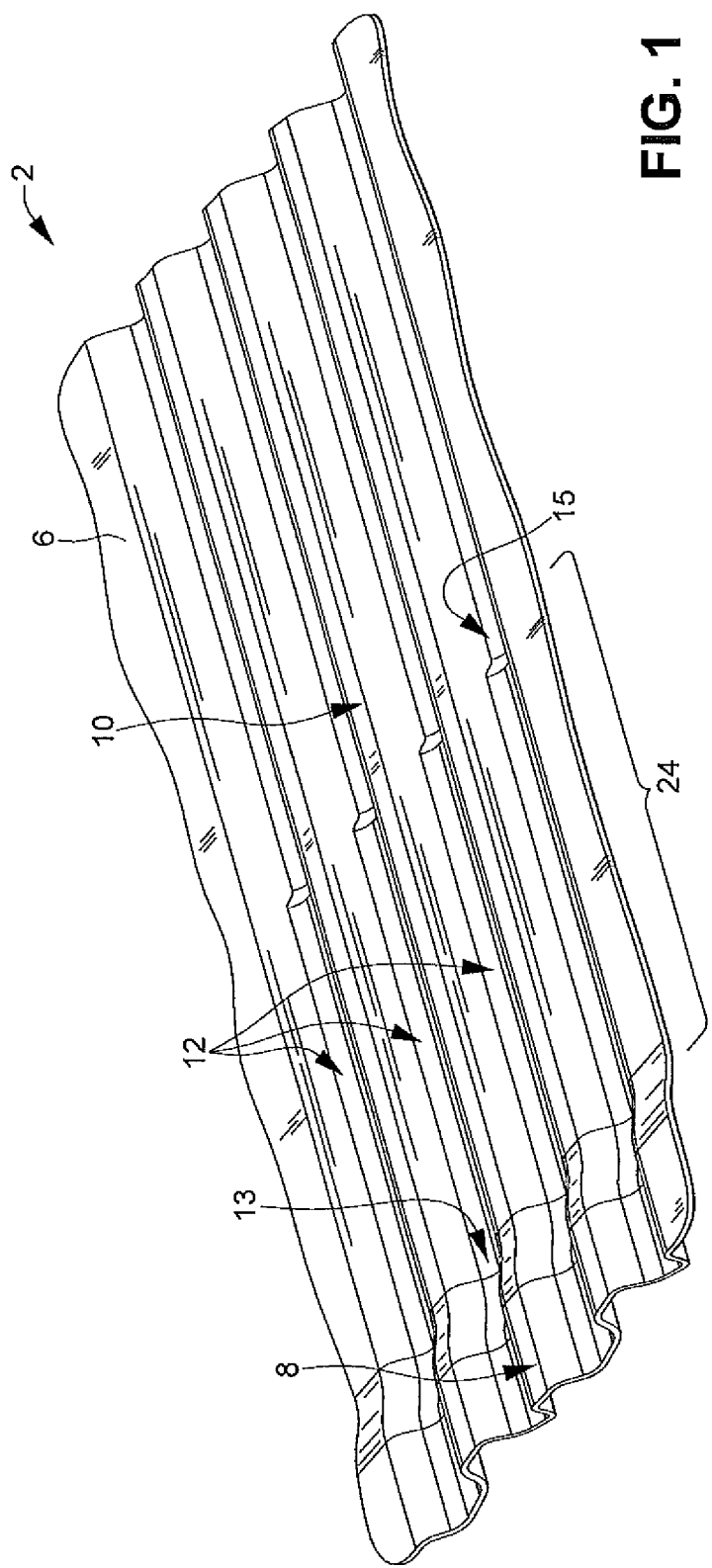
FIG. 1 is a fragmentary top perspective view of a fuel cell plate assembly according to an embodiment of the present disclosure.

The following detailed description and appended drawings describe and illustrate various embodiments of the invention. The description and drawings serve to enable one skilled in the art to make and use the invention, and are not intended to limit the scope of the invention in any manner.

As shown in FIGS. 1-4, the present disclosure includes a fuel cell plate assembly 2 for a fuel cell 4. An exemplary fuel cell 4 with which the fuel cell plate assembly 2 may be employed is disclosed in U.S. patent application Ser. No. 11/752,993 to Newman et al., the entire disclosure of which is hereby incorporated herein by reference. A plurality of the fuel cells 4 may be arranged in a stack to form a fuel cell stack. A skilled artisan should appreciate that the fuel cell plate assembly 2 of the present disclosure may be used in other types of fuel cells, as desired.

The fuel cell plate assembly 2 includes a first plate 6 having a feed region 8 and an active region 10. The feed region 8 may include a plurality of ports (not shown) and a plurality of header apertures (not shown) for delivery of reactants and a coolant to the fuel cell 4. A plurality of flow channels 12 is formed in the first plate 6. The flow channels 12 connect the feed region 8 and the active region 10 of the first plate 6. The first plate 6 also includes a first step 13 and a second step 15. The second step 15 is spaced apart from the first step 13. The first step 13 is disposed in the feed region 8. The second step 15 is disposed inboard from the first step 13 in the active region 10 of the first plate 6. It should be understood that the second step 15 is only formed in the flow channels 12, and not in the lands separating the flow channels 12 formed in the first plate 6. A skilled artisan should also understand that if there were a corresponding step in the lands, there would be no stress relief caused by the second step 15 as described further herein below. Each of the first step 13 and the second step 15 is oriented transverse or across the flow channels 12 in the respective feed region 8 and active region 10. In particular embodiments, each of the first step 13 and the second step 15 is oriented substantially orthogonal to the flow channels 12 of the first plate 6. The first and second steps 13, 15 may be formed in the first plate 6 by any means, for example, a stamping process. Other suitable orientations and means for forming the first step 13 and the second step 15 may be selected, as desired.

Figure 2:
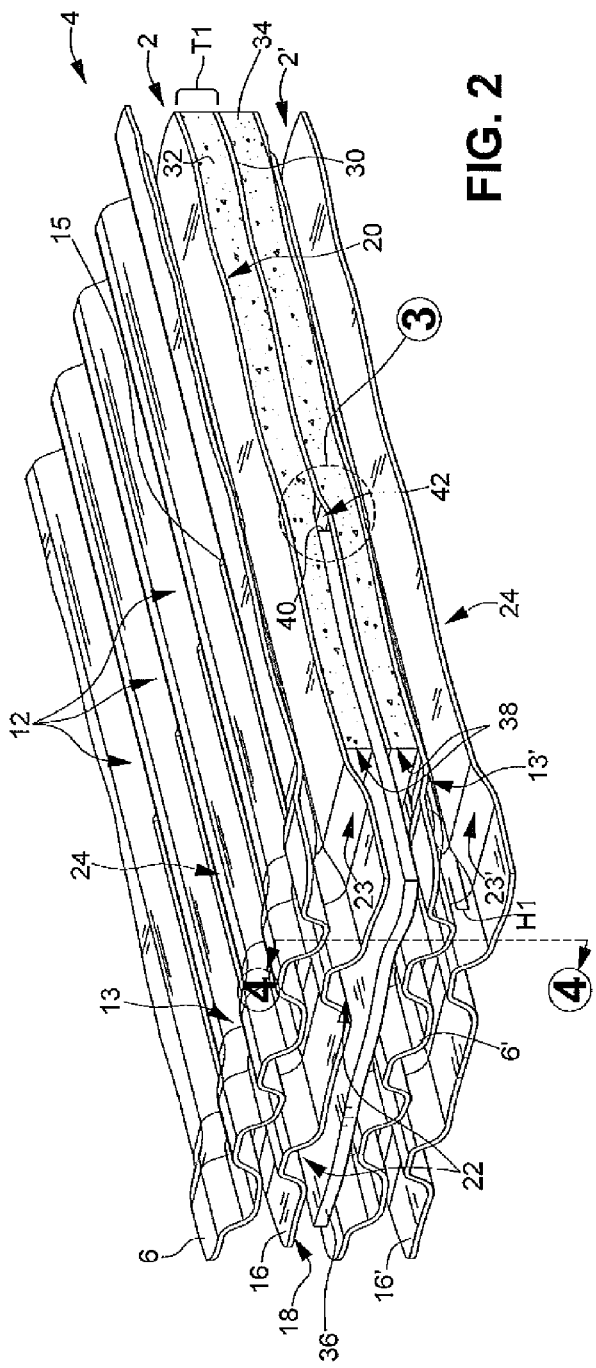
FIG. 2 is a fragmentary top perspective view of the fuel cell plate assembly shown in FIG. 1, assembled together with a membrane electrode assembly, a subgasket, a pair of diffusion media, and like fuel cell plate assemblies according to an embodiment of the present disclosure.
Figure 3:
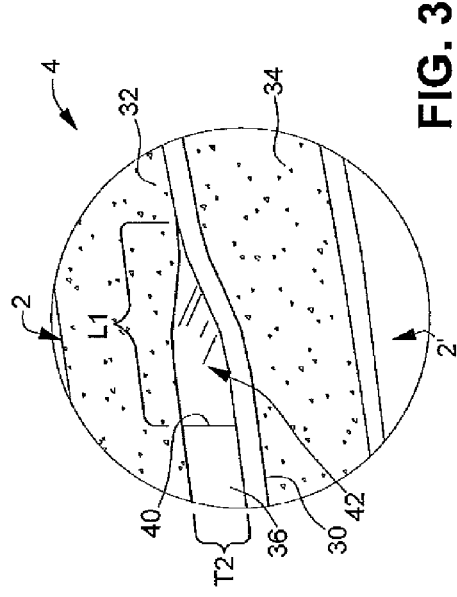
FIG. 3 is an enlarged fragmentary top perspective view of the assembly as indicated by circle 3 in FIG. 2, and further showing a tenting region adjacent an edge of the subgasket.
Figure 4:
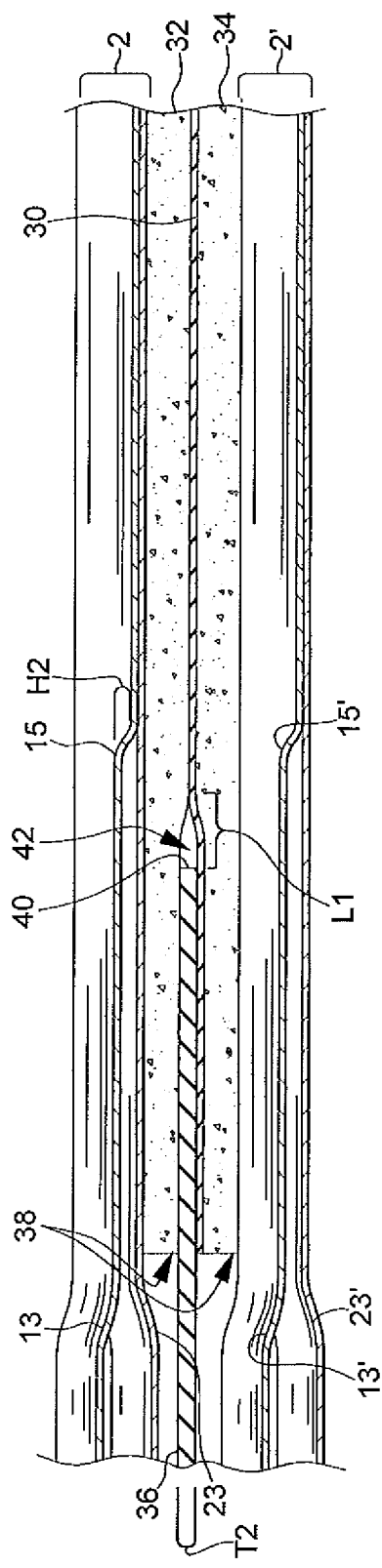
FIG. 4 is a fragmentary side cross-sectional elevational view of the assembly shown in FIGS. 2 and 3.

With reference to FIGS. 2-4, the fuel cell plate assembly 2 is a bipolar plate having the first plate 6 coupled to a second plate 16. Like the first plate 6, the second plate 16 includes a feed region 18 and an active region 20. A plurality of flow channels 22 are formed in the second plate 16 and connect the feed region 18 and the active region 20. The second plate 16 includes a first step 23 that is oriented transverse to the flow channels 22 in the feed region 18 of the second plate 16. The second plate 16 does not include a second step 15. The first step 13 of the first plate 6 is formed diametric to the first step 23 of the second plate 16. In particular, the first and second plates 6, 16 at the first steps 13, 23 are bent outward and away from one another. A skilled artisan should appreciate that selecting the same or different bending angles for the first steps 13, 23 and the second steps 15 is within the scope of the present disclosure.

In a particular embodiment, the first plate 6 is a cathode unipolar plate and the second plate 16 is an anode unipolar plate. The first plate 6 and the second plate 16 may be joined, for example, by a welding process to form the bipolar plate for the fuel cell 4. A portion of the flow channels 12 of the first plate 6 may also nest with a portion of the flow channels 22 of the second plate 16. Other suitable means for joining the first plate 6 and the second plate 16 to form the bipolar fuel cell plate assembly 2 may also be employed, as desired.

The fuel cell plate assembly 2 has a transition region 24 between the feed region 8, 18 and the active region 10, 20 on each of the first plate 6 and the second plate 16. The transition region 24 is defined between the first step 13, 23 and the second step 15. It should be understood that the transition region 24 is flexible and spring-like. The flexibility of the transition region 24 minimizes peak compressive stresses across the transition region 24 when the fuel cell plate assembly 2 is compressed in the fuel cell 4.

Referring to FIG. 2, the fuel cell 4 of the present disclosure includes a pair of the fuel cell plate assemblies 2, 2', which are referred to hereinafter as a first fuel cell plate assembly 2 and a second fuel cell plate assembly 2'. Like or related structure from the first fuel cell plate assembly 2 that is found in the second fuel cell plate assembly 2' is referred to with the same reference numeral and a prime symbol ('), for the purpose of clarity.

Each of the first fuel cell plate assembly 2 and the second fuel cell plate assembly 2' is a bipolar plate, for example, as described hereinabove. A membrane electrode assembly 30, including a polymer electrolyte membrane (not shown) and a pair of electrodes (not shown), is sandwiched between a pair of diffusion medium layers 32, 34. The membrane electrode assembly 30 and the diffusion medium layers 32, 34 are disposed between the active regions 8, 8', 18, 18' of the first fuel cell plate assembly 2 and the second fuel cell plate assembly 2'. A subgasket 36 is coupled with the membrane electrode assembly 30. The subgasket 36 may overlap the membrane electrode assembly 30, for example. As a nonlimiting example, the subgasket 36 is mechanically held in place against the membrane electrode assembly 30 by compression of the fuel cell 4. The subgasket 36 is disposed between the feed regions 8, 8', 18, 18' of the first fuel cell plate assembly 2 and the second fuel cell plate assembly 2'.

As illustrated in FIGS. 2-4, an outboard edge 38 of one of the diffusion medium layers 32, 34 is disposed adjacent the first step 13, 13', 23, 23' of one of the first fuel cell plate assembly 2 and the second fuel cell plate assembly 2'. Similarly, an inboard edge 40 of the subgasket 36 is disposed adjacent the second step 15, 15' of one of the first fuel cell plate assembly 2 and the second fuel cell plate assembly 2'. For example, the inboard edge of the subgasket 36 may be disposed roughly midway between the first step 13, 13', 23, 23' and the second step 15, 15'. It should be understood that the employment of the first step 13, 13', 23, 23' and the second step 15, 15' advantageously militates against the formation of undesirable compressive pressures when the fuel cell 4 is compressed during operation.

The first step 13, 13', 23, 23' has a height H1, and the second step 15, 15' has a height H2. The height H1 is set by the need to unnest the two flow channels and the height of the diffusion medium layers 32, 34. The height H2 is selected to minimize the undesirable compressive pressures due to the subgasket 36. In illustrative embodiments, the height H1 of the first step 13, 13', 23, 23' is approximately one-half of a thickness T1 of one of the first and second diffusion medium layers 32, 34. The height H2 of the second step 15, 15' may be approximately one-half of a thickness T2 of the subgasket 36. As a nonlimiting example, the height H2 of the second step is approximately 25 microns, and the thickness T2 of the subgasket 36 may be approximately 50 microns. A skilled artisan may select other suitable heights H1, H2 and thicknesses T1, T2, as desired.

It should be appreciated that a tenting region 42 is formed adjacent the second step 15, 15'. The tenting region 42 is a void defined by the membrane electrode assembly 30, the subgasket 36, and one of the diffusion medium layers 32, 34. The membrane electrode assembly 30 is unsupported by the subgasket 36 and the diffusion medium layers 32, 34 at the tenting region 42. The tenting region 42 has a length L1. It should also be understood that where the length L1 is undesirably long, the membrane electrode assembly 30 may buckle when the fuel cell 4 is compressed. Therefore, the length L1 of the tenting region 42 is selected to militate against a buckling of the membrane electrode assembly 30 when the fuel cell 4 is compressed. In one embodiment, the tenting region 42 has the length L1 less than about 300 microns, and in other embodiments between about 100 microns and about 200 microns in length.

The first step 13, 23 of the fuel cell plate assembly 2 desirably unnests the flow channels 12, 22 of the first plate 6 and the second plate 16, and permits a flow of reactants to and from the active region 10, 20 of the fuel cell 4. Advantageously, the length between first 13, 23 and second step 15 relieves a stress at the soft good edge. The distance from the edge 38 to said first step 13, 23 will reduce the load at those edges. The height of the step 13, 23 is set based upon available space in vertical dimension to enable unnesting and specific feed channel heights.

It is known that peak compressive stresses in excess of 1000 psi may occur at the inboard edge 40 of the subgasket 36 in prior art fuel cells having conventional fuel cell plate assemblies without the first and second steps 13, 23, 15, under typical fuel cell operating conditions. The peak compressive stresses may be undesirably high when high stiffness diffusion medium layers are employed. The conventional fuel cell plate assemblies also have fine pitch cathode channels that are known to develop tremendous loads when fully nested.

A skilled artisan should understand that no second step is formed in the second plate 16, which is employed as an anode plate in the fuel cell plate assembly 2 of the present disclosure. There is only the first step 23 at the feed region transition of the second plate 16. There is typically contact between the coolant side of the first or cathode plate 6 and the coolant side of the lands of the second or anode plate 16. The second step would not provide stress relief in the second plate 16 because the flow channels 22 formed in the second plate 16 do not contact a corresponding land of the first plate 6.

It has been surprisingly found that the employment of the second step 15, as described hereinabove, minimizes the peak compressive stresses at the inboard edge 40 of the subgasket 36 up to about forty percent (40%). The second step 15 has been unexpectedly found to permit the transition region 24 to flex in a controlled manner, and contribute to the reduction in peak compressive stresses. The addition of the second step 15 also provides relief to the transition region 24 of the fuel cell plate assembly 2 when nested. The peak compressive stresses at the outboard edges 38 of the diffusion medium layers 32, 34, and the inboard edge 40 of the subgasket 36, are thereby managed.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell plate assembly comprising:
a first plate having a feed region including a header aperture formed therein and an active region, a plurality of flow channels formed in the first plate connecting the header aperture of the feed region and the active region, the first plate further including a first step oriented transverse to the flow channels in the feed region and a second step oriented transverse to the flow channels in the active region, the first step formed in both the flow channels and lands separating the flow channels in the feed region of the first plate, the first step formed in a portion of the first plate spaced apart from a perimeter of the header aperture in a direction toward the active region of the first plate, and the second step formed only in the flow channels and not in lands separating the flow channels in the active region of the first plate, a depth of the flow channels in the active region inboard from the second step greater than the depth of the flow channels outboard from the second step.

2. The fuel cell plate assembly of claim 1, further comprising a second plate having a feed region and an active region, a plurality of flow channels formed in the second plate connecting the feed region and the active region, the second plate further including a first step oriented transverse to the flow channels in the feed region and not including a second step.

3. The fuel cell plate assembly of claim 2, wherein the first plate is a cathode plate and the second plate is an anode plate, the first plate and the second plate joined to form a bipolar plate for a fuel cell stack.

4. The fuel cell plate assembly of claim 3, wherein a portion of the flow channels of the first plate nest with a portion of the flow channels of the second plate.

5. The fuel cell plate assembly of claim 1, wherein a transition region between the active region and the feed region is defined between the first step and the second step.

6. The fuel cell plate assembly of claim 5, wherein the transition region is flexible and minimizes peak compressive stresses across the transition region when the fuel cell plate assembly is compressed in a fuel cell stack.

7. The fuel cell of claim 2, wherein the first step of the first plate is formed diametric to the first step of the second plate wherein the first step of the first plate and the first step of the second plate are oriented in opposite directions.

8. A fuel cell, comprising:
a first fuel cell plate assembly having a feed region including a header aperture formed therein and an active region, a plurality of flow channels formed in the first fuel cell plate assembly connecting the header aperture of the feed region and the active region, the first fuel cell plate assembly further including a first step oriented transverse to the flow channels in the feed region, the first step formed in both the flow channels and lands separating the flow channels in the feed region of the first fuel cell plate, the first step formed in a portion of the first plate spaced apart from a perimeter of the header aperture in a direction toward the active region, and a second step oriented transverse to the flow channels in the active region, the second step formed only in the flow channels and not in lands separating the flow channels in the active region of the first fuel cell plate, a depth of the flow channels in the active region inboard from the second step greater than the depth of the flow channels outboard from the second step;
a second fuel cell plate assembly having a feed region and an active region, a plurality of flow channels formed in the second fuel cell plate assembly connecting the feed region and the active region, the second fuel cell plate assembly further including a first step oriented transverse to the flow channels in the feed region;

a membrane electrode assembly sandwiched between a pair of diffusion medium layers, the membrane electrode assembly and the diffusion medium layers disposed between the active regions of the first fuel cell plate assembly and the second fuel cell plate assembly; and a subgasket coupled with the membrane electrode assembly and disposed between the feed regions of the first fuel cell plate assembly and the second fuel cell plate assembly.

9. The fuel cell of claim 8, wherein an edge of one of the diffusion medium layers is disposed adjacent the first step of one of the first fuel cell plate assembly and the second fuel cell plate assembly.

10. The fuel cell of claim 9, wherein an edge of the subgasket is disposed adjacent the second step of one of the first fuel cell plate assembly and the second fuel cell plate assembly.

11. The fuel cell of claim 10, wherein a height of the second step is about one-half of a thickness of the subgasket.

12. The fuel cell of claim 11, wherein the height of the second step is about 25 microns, and the thickness of the subgasket is about 50 microns.

13. The fuel cell of claim 8, wherein a sufficient pressure is maintained on the diffusion medium layers so that a tenting region formed adjacent the second step is sufficiently small to militate against a buckling of the membrane electrode assembly.

14. The fuel cell of claim 13, wherein the tenting region is a void defined by the membrane electrode assembly, the subgasket, and one of the diffusion medium layers, and wherein the membrane electrode assembly is unsupported by the subgasket and the diffusion medium layers at the tenting region.

15. The fuel cell of claim 13, wherein the tenting region is less than about 300 microns in length.

16. The fuel cell of claim 15, wherein the tenting region is between about 100 microns and about 200 microns in length.

17. The fuel cell of claim 8, wherein the first step and the second step of the first fuel cell plate assembly is oriented substantially orthogonal to the flow channels of the first fuel cell plate assembly, and the first step of the second fuel cell plate assembly is oriented substantially orthogonal to the flow channels of the second fuel cell plate assembly.

18. The fuel cell of claim 8, wherein the first fuel cell plate assembly includes a first plate having a feed region and an active region, a plurality of flow channels formed in the first plate connecting the feed region and the active region, and a second plate having a feed region and an active region, a plurality of flow channels formed in the second plate connecting the feed region and the active region, and wherein the first plate is a cathode plate and the second plate is an anode plate, the first plate and the second plate joined to form the first fuel cell plate assembly, the second step of the first fuel cell plate assembly formed only in the first plate.

19. The fuel cell of claim 18, wherein the second fuel cell plate assembly includes a first plate having a feed region and an active region, a plurality of flow channels formed in the first plate and connecting the feed region and the active region, and a second plate having a feed region and an active region, a plurality of flow channels formed in the second plate and connecting the feed region and the active region, and wherein the first plate is a cathode plate and the second plate is an anode plate, the first plate and the second plate joined to form the second fuel cell plate assembly, the second step of the second fuel cell plate assembly formed only in the first plate.

20. A fuel cell stack, comprising:

a plurality of fuel cells arranged in a stack, at least one of the fuel cells including a first fuel cell plate assembly having a feed region including a header aperture formed therein and an active region, a plurality of flow channels formed in the first fuel cell plate assembly connecting the header aperture of the feed region and the active region, the first plate further including a first step oriented transverse to the flow channels in the feed region and a second step oriented transverse to the flow channels in the active region, the first step formed in both the flow channels and lands separating the flow channels in the feed region of the first plate, the first step formed in a portion of the first plate spaced apart from a perimeter of the header aperture in a direction toward the active region, and the second step formed only in the flow channels and not in lands separating the flow channels in the active region of the first fuel cell plate, a depth of the flow channels in the active region inboard from the second step greater than the depth of the flow channels outboard from the second step, a second fuel cell plate assembly having a feed region and an active region, a plurality of flow channels formed in the second fuel cell plate assembly connecting the feed region and the active region, the second plate further including a first step oriented transverse to the flow channels in the feed region and a second step oriented transverse to the flow channels in the active region, the second step formed only in the flow channels, a membrane electrode assembly sandwiched between a pair of diffusion medium layers, the membrane electrode assembly and the diffusion medium layers disposed between the active regions of the first fuel cell plate assembly and the second fuel cell plate assembly, a subgasket coupled with the membrane electrode assembly and disposed between the feed regions of the first fuel cell plate assembly and the second fuel cell plate assembly.

* * * * *